US009310246B2

(12) United States Patent
Rothman

(10) Patent No.: US 9,310,246 B2
(45) Date of Patent: Apr. 12, 2016

(54) NOISE REDUCTION IN INFRASOUND DETECTION

(71) Applicant: University of Alaska Fairbanks, Fairbanks, AK (US)

(72) Inventor: Jeffrey L. Rothman, Fairbanks, AK (US)

(73) Assignee: University of Alaska Fairbanks, Fairbanks, AK (US)

( * ) Notice: Subject to any disclaimer, the term of this patent is extended or adjusted under 35 U.S.C. 154(b) by 242 days.

(21) Appl. No.: 14/057,704

(22) Filed: Oct. 18, 2013

(65) Prior Publication Data

US 2014/0260646 A1    Sep. 18, 2014

Related U.S. Application Data

(60) Provisional application No. 61/716,324, filed on Oct. 19, 2012.

(51) Int. Cl.
  *G01L 9/02*    (2006.01)
  *G01H 11/06*   (2006.01)

(52) U.S. Cl.
  CPC ..................................... *G01H 11/06* (2013.01)

(58) Field of Classification Search
  CPC ....................................................... G01H 11/06

USPC ................ 73/719, 1.35, 861.42, 861.47, 718; 324/656, 658, 676
See application file for complete search history.

(56) References Cited

U.S. PATENT DOCUMENTS

| 5,396,118 A * | 3/1995 | Yaguchi ........................ 327/516 |
| 5,531,111 A * | 7/1996 | Okamoto et al. ............... 73/149 |
| 2006/0200301 A1* | 9/2006 | Hasegawa ..................... 701/114 |

* cited by examiner

*Primary Examiner* — Lisa Caputo
*Assistant Examiner* — Brandi N Hopkins
(74) *Attorney, Agent, or Firm* — Ballard Spahr LLP

(57) ABSTRACT

Provided are methods, circuits and apparatuses for detecting pressure variations. The circuit can comprise at least two pressure sensors electrically coupled in parallel. At least one pressure sensor can have a differential input and a differential output. The circuit can also comprise a first switching mechanism electrically coupled to the differential input of the at least one pressure sensor. The first switching mechanism can be configured to electrically couple a first current source to the at least one pressure sensor according to a first reference signal. The circuit can also comprise a second switching mechanism electrically coupled to the differential output of the at least one pressure sensor. The second switching mechanism can be configured to electrically couple a second current source to the at least one pressure sensor according to a second reference signal.

35 Claims, 16 Drawing Sheets

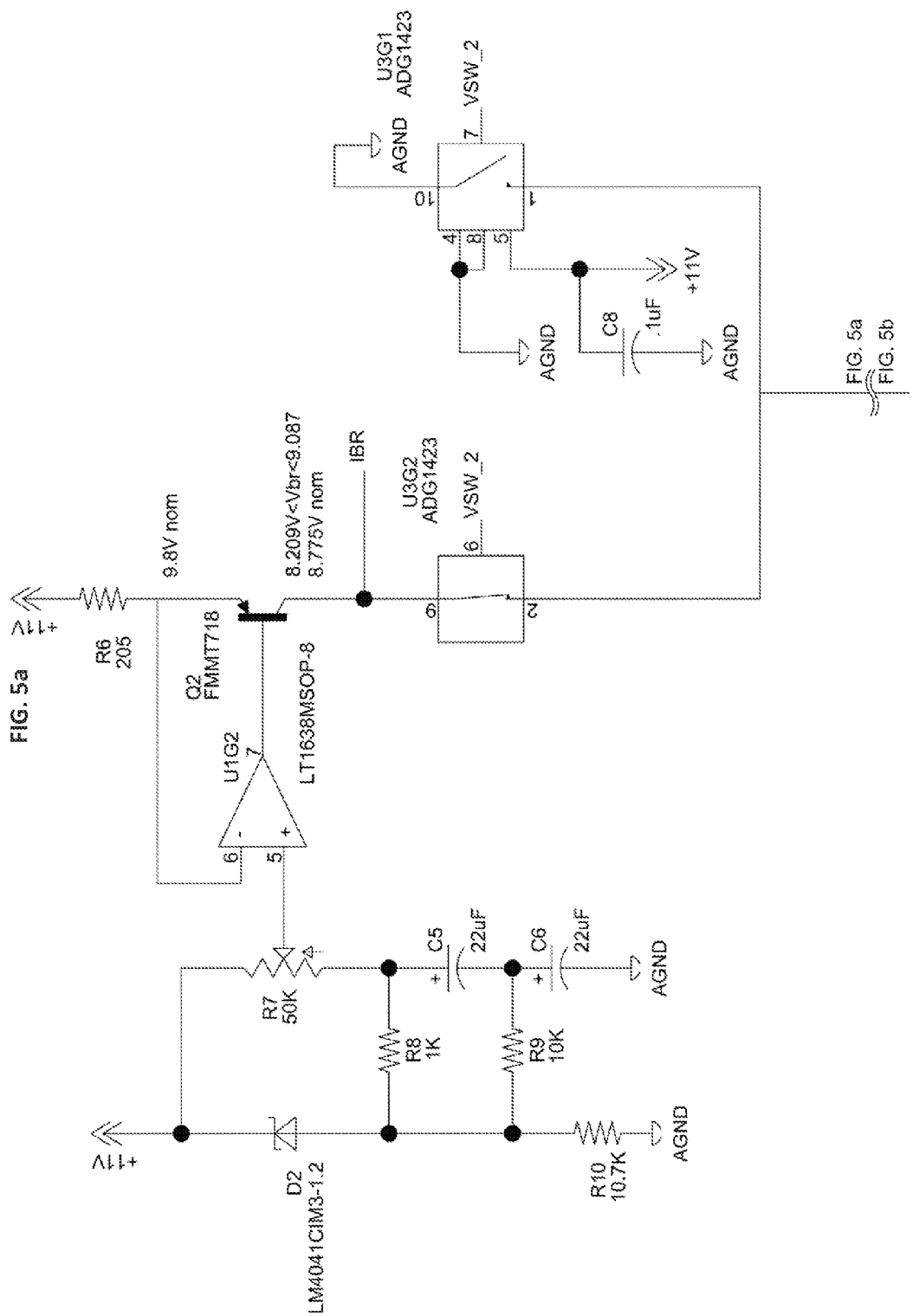

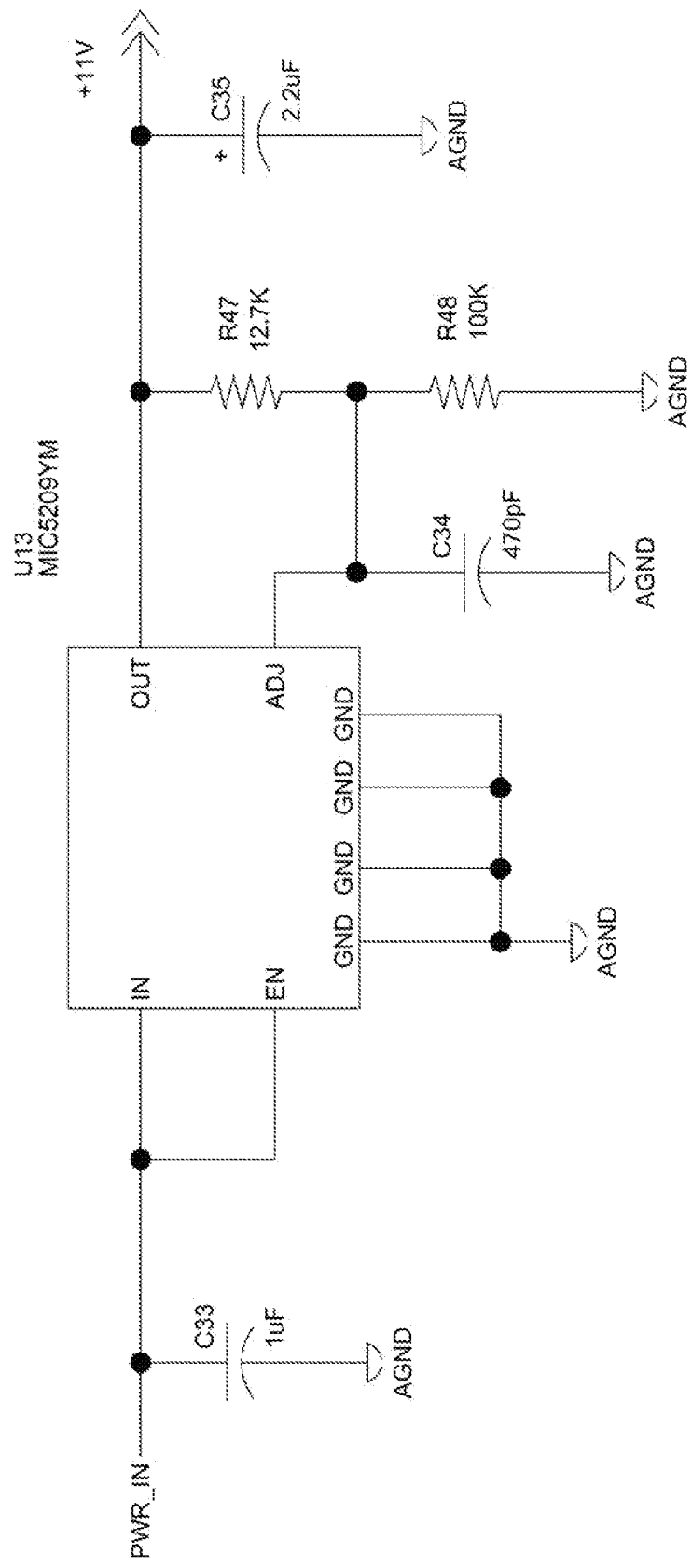

NOISE REDUCTION IN INFRASOUND DETECTION

CROSS REFERENCE TO RELATED PATENT APPLICATION

This application claims priority to U.S. Provisional Application No. 61/716,324 filed Oct. 19, 2012, herein incorporated by reference in its entirety.

BACKGROUND

Infrasound occurs at frequencies below the range of human hearing. These signals are of interest because of the signals' ability to propagate long distances with very little attenuation, making them useful for both scientific and military applications (nuclear test ban treaty monitoring in particular). In the past, infrasound microphones have been built with large diaphragms and reference chambers to achieve the desired sensitivity. For many applications, the size of these devices makes them impractical for many applications. Thus, there is a need for sensing devices reduced in size, weight and cost, which are more practical for a wide range of new uses.

SUMMARY

It is to be understood that both the following general description and the following detailed description are exemplary and explanatory only and are not restrictive, as claimed. Provided are methods, circuits and apparatuses for detecting pressure variations, such as infrasound. In one aspect, exemplary circuits can comprise at least two pressure sensors electrically coupled in parallel. At least one of the pressure sensors can comprise a differential input and a differential output. The circuit can also comprise a first switching mechanism electrically coupled to the differential input of the at least one pressure sensor. The first switching mechanism can be configured to electrically couple a first current source to the at least one pressure sensor according to a first reference signal. The circuit can also comprise a second switching mechanism electrically coupled to the differential output of the at least one pressure sensor. The second switching mechanism can be configured to electrically couple a second current source to the at least one pressure sensor according to a second reference signal.

In another aspect, exemplary apparatuses can comprise a sensing circuit. The sensing circuit can comprise at least two pressure sensors electrically coupled in parallel. At least one of the pressure sensors can have a differential input and a differential output. The sensing circuit can comprise a first switching mechanism electrically coupled to the differential input of the at least one pressure sensor. The first switching mechanism can be configured to electrically couple a first current source to the at least one pressure sensor according to a first reference signal. The sensing circuit can comprise a second switching mechanism electrically coupled to the differential output of the at least one pressure sensor. The second switching mechanism can be configured to electrically couple a second current source to the at least one pressure sensor according to a second reference signal. The apparatus can also comprise a manifold configured to receive a pressure and communicate the pressure to the at least two pressure sensors. The apparatus can also comprise a reference chamber configured to provide a reference pressure to the at least two pressure sensors. The apparatus can further comprise a housing configured to enclose the at least two pressure sensors.

In yet another aspect, exemplary methods can comprise use of a sensing device. The sensing device can comprise at least two pressure sensors electrically coupled in parallel. At least one of the pressure sensors can comprise a differential input and a differential output. The sensing device can comprise a first switching mechanism electrically coupled to the differential input of the at least pressure sensor. The first switching mechanism can be configured to electrically couple a first current source to the pressure sensors according to a first reference signal. The sensing device can comprise a second switching mechanism electrically coupled to the differential output of the at least one pressure sensor. The second switching mechanism can be configured to electrically couple a second current source to the pressure sensors according to a second reference signal. The method can also comprise coupling the sensing device to a power source. The method can further comprise collecting pressure measurements with the sensing device.

In yet another aspect, exemplary methods can comprise providing a power supply to at least two pressure sensors based on a first reference signal. The at least two pressure sensors can be electrically coupled in parallel. A differential signal can be received from the at least two pressure sensors. An alternating current offset voltage of the differential signal can be neutralized based on a second reference signal. The neutralized differential signal can be amplified.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 5a is a circuit diagram illustrating an exemplary first current source and switch;

FIG. 7 is a circuit diagram illustrating an exemplary voltage regulator;

DETAILED DESCRIPTION

Figure 1:
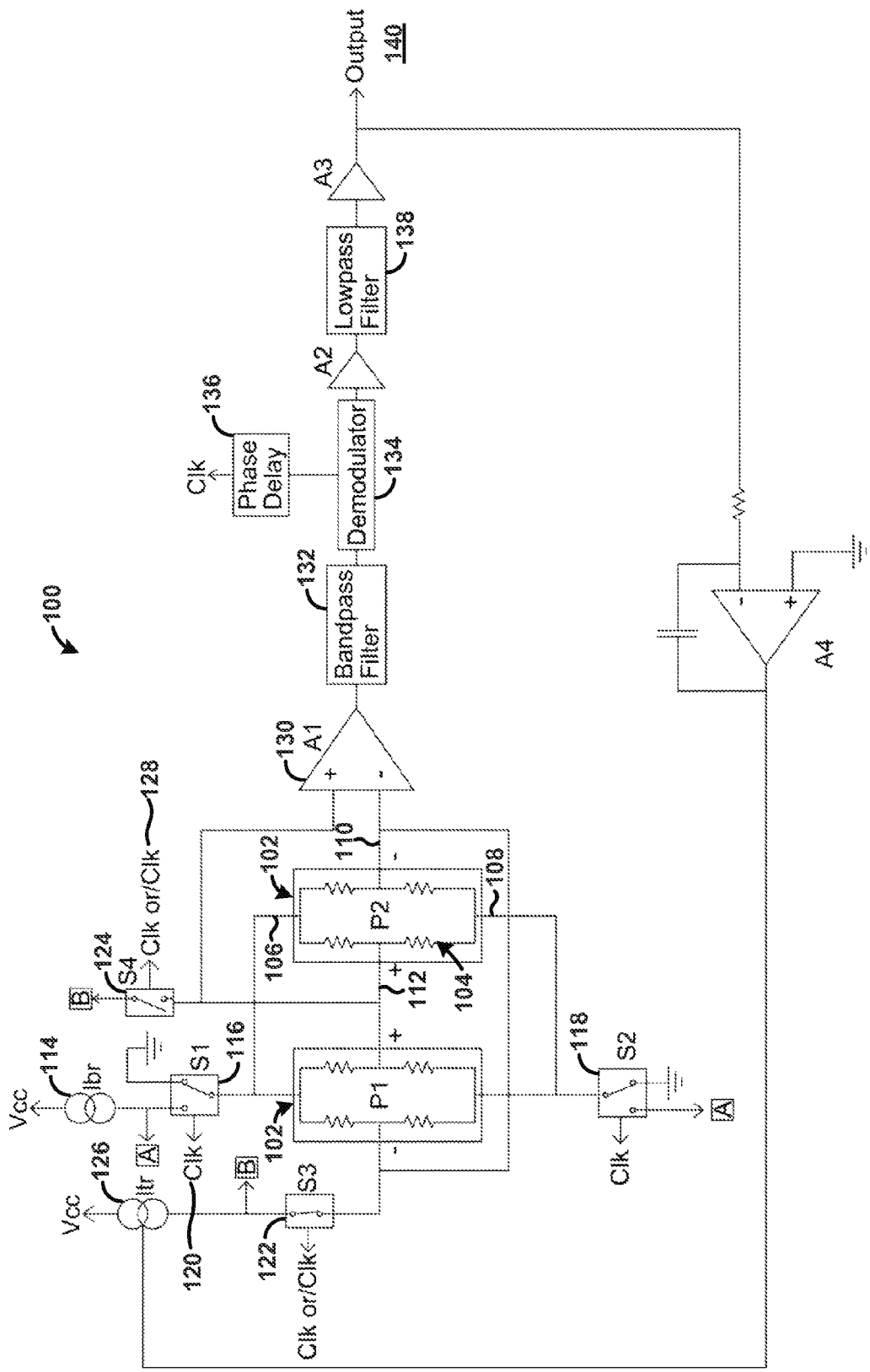
FIG. 1 is a circuit diagram illustrating an exemplary apparatus for detecting pressure variations.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to methods, circuits, and apparatuses for detecting pressure variations, such as infrasound. Those skilled in the art will appreciate that present methods may be used in systems that employ both digital and analog equipment. One skilled in the art will appreciate that provided herein is a functional description and that the respective functions can be performed by software, hardware, or a combination of software and hardware.

FIG. 1 is a circuit diagram of an exemplary apparatus 100 for detecting pressure variations, such as infrasound. In one aspect, the apparatus 100 can comprise at least two pressure sensors 102. The pressure sensors 102 can be electrically coupled in parallel. The pressure sensors 102 can be commercially available, miniature, piezoresistive, differential pressure sensors. Each pressure sensor 102 can comprise a set of resistors 104 configured as a Wheatstone bridge, and at least one of the resistors of the set of resistors 104 can be configured to provide a resistance that varies based on changes in pressure upon the resistor.

In one aspect, each pressure sensor 102 can have a differential input 106 and 108 and a differential output 110 and 112. The differential output can comprise an inverting output 110 and a non-inverting output 112. The pressure sensors 102 can generate a positive output voltage on the non-inverting output 112 (designated with the + sign) when pressure is applied to the positive pressure input ports of the pressure sensors 102. In one aspect, the resistors 104 are embedded in a silicon diaphragm, and a hose barb is on either side of the diaphragm. If a positive voltage is on differential input 106 and pressure is applied to the positive pressure port, the differential output can be positive. The inverting output 110 can behave similarly, but with opposite polarity.

In one aspect, the pressure sensors 102 can be electrically coupled to a power supply. For example, a DC voltage or current can be used to drive piezoresistive sensors. Accordingly, the apparatus 100 can comprise a first current source 114. A DC amplifier can then amplify the differential output voltage. It should be noted that many amplifiers suffer from 1/f noise, a type of noise that increases as the frequency drops. In one aspect, the problem of 1/f noise can be addressed by the techniques described in the present disclosure. To address this problem, at least in part, a phase sensitive detector can be used. Additionally, the apparatus 100 can comprise a first switching mechanism 116 and 118 electrically coupled to the differential input 106 and 108 of at least one of the pressure sensors 102. The first switching mechanism 116 and 118 can be configured to electrically couple the first current source 114 to the pressure sensors 102 according to a first reference signal 120. For example, the first switching mechanism can comprise one or more switches 116 and 118 configured to alternately inject the first current source 114 (Ibr) into the top (e.g., differential input 106) and bottom (e.g., differential input 108) of the resistive bridges of the sensors 102. The first reference signal 120 can be a clock signal. In one aspect, the switches 116 and 118 can be controlled by a 1 KHz clock signal. In another aspect, the first switching mechanism 116 and 118 can be configured to eliminate large changes in the common mode voltage from the pressure sensors 102 by alternating injecting current into the top 106 and bottom 108 of the pressure sensors 102.

In one aspect, the first switching mechanism 116 and 118 can be configured to cause, at least in part, an AC signal to appear on the differential output 110 and 112 of the pressure sensors 102 when pressure is applied to the pressure sensors 102. In one aspect, the first switching mechanism 116 and 118 can be configured to increase a signal-to-noise ratio of the pressure sensors 102 by a predefined factor. This example configuration can reverse the current through the pressure sensors 102 and can increase the signal-to-noise ratio compared to using a single switch and simply gating the drive current. For example, the signal-to-noise ratio can be increased by driving the first current source 114 in alternate directions through the pressure sensors 102 (e.g., thereby doubling the AC output signal amplitude with no increase in power consumption).

In one aspect, the apparatus 100 can comprise a resistor electrically coupled to the first switching mechanism 116 and 118. The resistor can be configured to provide a resistance that varies based on changes in temperature. The temperature compensating resistor can be configured to cause the first current source 114 to be configured as a temperature compensating drive current for the resistive bridge (e.g., set of resistors 104). The first current source 114 can be configured to vary with temperature to compensate for the temperature coefficient of the pressure sensors 102. Piezoresistive pressure sensors can be temperature sensitive and can have large signal offsets. In this design, the first current source 114 can change with temperature to precisely compensate for changes in the sensor gain.

In one aspect, the apparatus 100 can comprise a second switching mechanism 122 and 124 electrically coupled to the differential output 110 and 112 of at least one of the pressure sensors 102. The second switching mechanism can comprise one or more switches 122 and 124. The second switching mechanism 122 and 124 can be configured to electrically couple a second current source 126 to the pressure sensors 102 according to a second reference signal 128. In one aspect, the second switching mechanism 122 and 124 can be configured to neutralize an alternating current offset voltage of the pressure sensors 102. Since the pressure sensor drive current (e.g. first current source 114) can alternate direction, imbalances in the resistive legs of the pressure sensors 102 can cause an AC signal to appear on the differential output 110 and 112, and the amplitude of the AC signal can be proportional to the degree of the imbalance. Accordingly, the offset can be removed by servoing, or otherwise providing feedback to the sensor outputs 110 and 112 to zero the offset using a voltage controlled second current source 126 (Itr). The high output impedance of the second current source 126 can allow the second current source 126 to correct the offset without affecting the temperature sensitivity of the sensors 102. The second current source 126 can be injected into alternating sides of the sensor bridges to null the AC output signal. It should be noted that reducing the second current source 126 can reduce the amount of noise injected into the pressure sensors 102. By selecting pressure sensors 102, during production, such that the pressure sensors' 102 offsets cancel, the amount of current from the second current source 126 can be reduced thereby minimizing the noise contributed by the feedback process.

In one aspect, the first reference signal 120 can be the same as the second reference signal 128. For example, the second switching mechanism 122 and 124 can be controlled by the first reference signal 120 and/or second reference signal 128, depending on the polarity of the sensor offset. The second reference signal 128 can be in or out of phase with the first reference signal 120 depending on the polarity of the sensor offset. In one aspect, the second reference signal 128 can be 180 degrees out of phase with the first reference signal 120.

In one aspect, the apparatus 100 can comprise an amplifier 130 electrically coupled to the pressure sensors. The amplifier 130 can be configured to receive differential signals from at least one pressure sensor 102 and provide a signal proportional to the difference of the voltages of the differential signals. Since the first switching mechanism 116 and 118 can be configured to eliminate large changes in the common mode voltage, the common mode rejection specification can be eased for the amplifier 130. Additionally, the differential signals received by the amplifier 130 can be modified by the second switching mechanism 122 and 124. For example, nulling directly at the sensor 102 caused by the second switching mechanism 122 and 124 and second current source 126 can allow the amplifier 130 to have high gain and be optimized for low noise.

In one aspect, the apparatus 100 can comprise a bandpass filter 132 electrically coupled to the amplifier 130. The bandpass filter 132 can be configured to receive a signal from the amplifier 130 and provide a portion of the signal within a predefined frequency range. For example, the bandpass filter 132 can be configured to allow a 1 KHz output signal to pass through and, thus, can remove 1/f noise.

In one aspect, the apparatus 100 can comprise a demodulator 134 electrically coupled to the bandpass filter 132. The demodulator 134 can be configured to receive an alternating current (AC) signal from the bandpass filter 132 and provide a direct current (DC) signal. For example, the demodulator 134 can full wave rectify the signal using a phase delayed clock. The phase delayed clock signal can be provided by a phase delay component 136 configured to receive a clock signal, such as the first reference signal, and provide phase delayed signal.

In one aspect, the apparatus 100 can comprise a lowpass filter 138. The lowpass filter 138 can be configured to remove high frequency components from a received signal and produce a low noise signal proportional to the applied pressure. Additionally, the apparatus 100 can comprise other circuit components such as amplifiers (e.g., amplifiers labeled as A2, A3, and A4), resistors, capacitors, and the like to meet individual design specifications.

Figure 2:
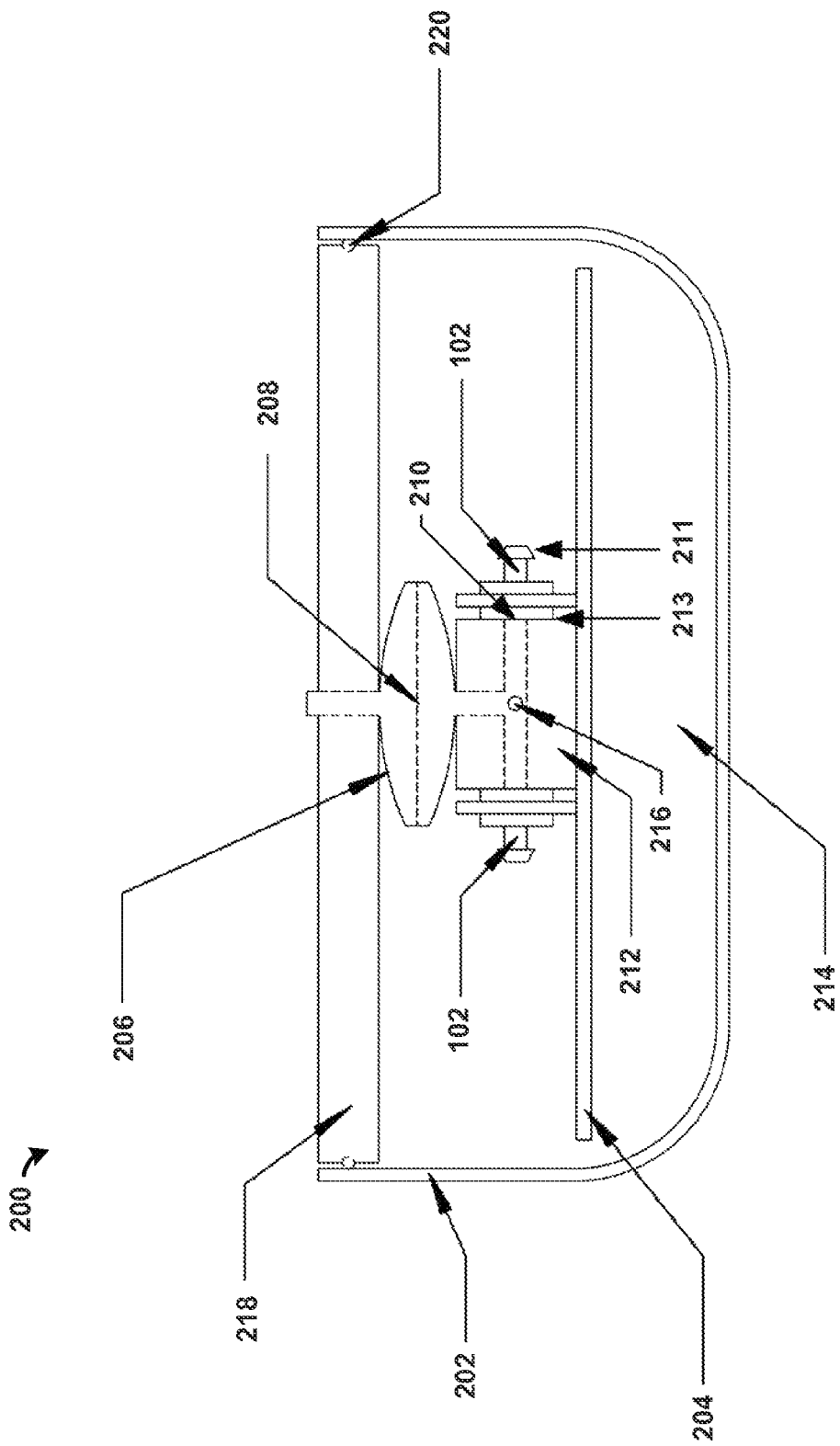
FIG. 2 is a cross-section illustrating an exemplary apparatus for detecting pressure variations.

FIG. 2 is a cross-section of an exemplary apparatus 200 for detecting pressure variations, such as infrasound. The apparatus 200 can comprise some or all of the elements described above for the apparatus 100. The apparatus 200 can comprise at least two pressure sensors 102 configured in parallel. In one aspect, the apparatus 200 can comprise a housing 202 configured to enclose the pressure sensors 102. The pressure sensors 102 can be mounted on a printed circuit board (PCB) 204. In one aspect, the apparatus 200 can comprise a transducer protector 206. The transducer protector, can comprise a hydrophobic membrane 208. One or more of the at least two pressure sensors 102 can comprise differential inputs. The differential inputs can comprise a non-inverting input 210 and an inverting output.

The non-inverting inputs 210 of the pressure sensors 102 can be coupled (e.g., glued) into a manifold 212. The manifold 212 can be configured to receive a pressure and communicate the pressure to the pressure sensors 102. The pressure sensors 102 can be coupled to the manifold 212 such that vibrational noise is cancelled. For example, a pressure sensor 102 can have a front 211 and a back 213, and the back of the pressure sensor 102 can face the back 213 of another pressure sensor 102. Thus, the back 213 of the pressure sensor 102 can be coupled to the manifold 212. The pressure sensors 102 can be connected together by a manifold 212 that applies pressure to the positive differential inputs of both pressure sensors 102. Physically, the pressure sensors 102 can be mounted back to back, such that the back to back configuration can cancel spurious signals caused by vibrations. The pressure sensors 102 can be configured back to back and in parallel to reduce thermally induced Johnson noise (at the expense of power consumption). Noise from the pressure sensors 102 can be reduced to arbitrarily low levels by paralleling a large number of pressure sensors 102 together.

In one aspect, the apparatus 200 can comprise a reference chamber 214. The reference chamber 214 can be within the housing 202. The reference chamber 214 can be configured to provide a reference pressure to the pressure sensors 102. The hydrophobic membrane 208 can prevent moisture from entering the reference chamber 214, where moisture can damage the electronics. The hydrophobic membrane 208 can be configured such that infrasound signals can pass through the transducer protector 206 and can be measured with respect to the pressure inside the reference chamber 214. In one aspect, the manifold 212 can comprise a vent hole 216. The vent hole 216 in the manifold 212 can prevent the pressure sensors 102 from being damaged by large changes in ambient pressure. The time constant, created by the vent hole 216 and reference volume, can be chosen to be long compared to the time constant created by the auto-nulling circuit.

In one aspect, the apparatus 200 can comprise a face plate 218 and an o-ring 220. The face plate 218 and o-ring 220 can be configured to close and seal the housing 202. In another aspect, the apparatus 200 can comprise a housing without a reference chamber. For example, if more durable pressure sensors are available some protective measures will be unnecessary. The inverting inputs can be sealed if the housing does not comprise a reference chamber. Thus, the weight of the microphone can be reduced even further. Additionally, in some implementations, with use of feedback techniques to null offsets directly at the sensor, the reference chamber can be eliminated.

Figure 3:
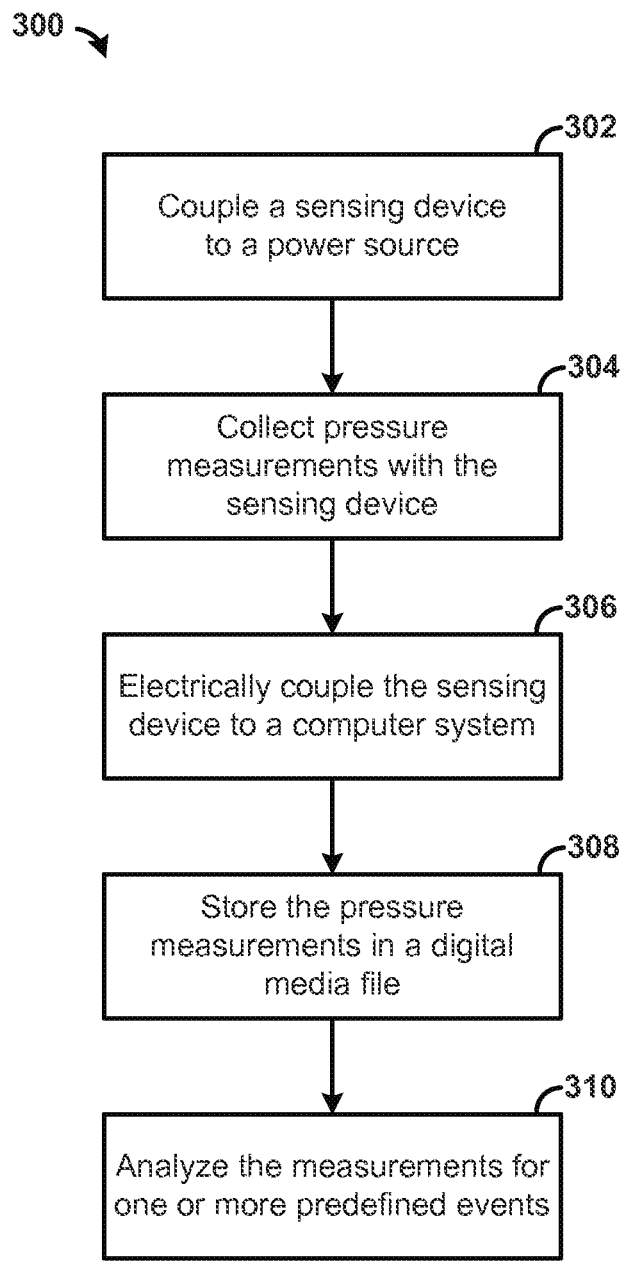
FIG. 3 is a flowchart illustrating an exemplary method of detecting pressure variations.

FIG. 3 is a flowchart illustrating an exemplary method 300 of detecting pressure variations, such as infrasound. In step 302, a sensing device can be coupled to a power source. The sensing device can comprise some or all of the elements of the apparatuses 100 and 200 described above. In step 304, pressure measurements can be collected with the sensing device. In step 306, the sensing device can be electrically coupled to a computer system. For example, the sensing device can be coupled directly to the computer system or can be coupled through a wireless network. In step 308, the pressure measurements can be stored in a digital media file. In step 310, the measurements for one or more predefined events can be analyzed. The predefined events can be represented by one or more signal patterns within the measurements. Therefore, step 310 can be performed by searching for one or more signal patterns within the measurements.

Figure 4:
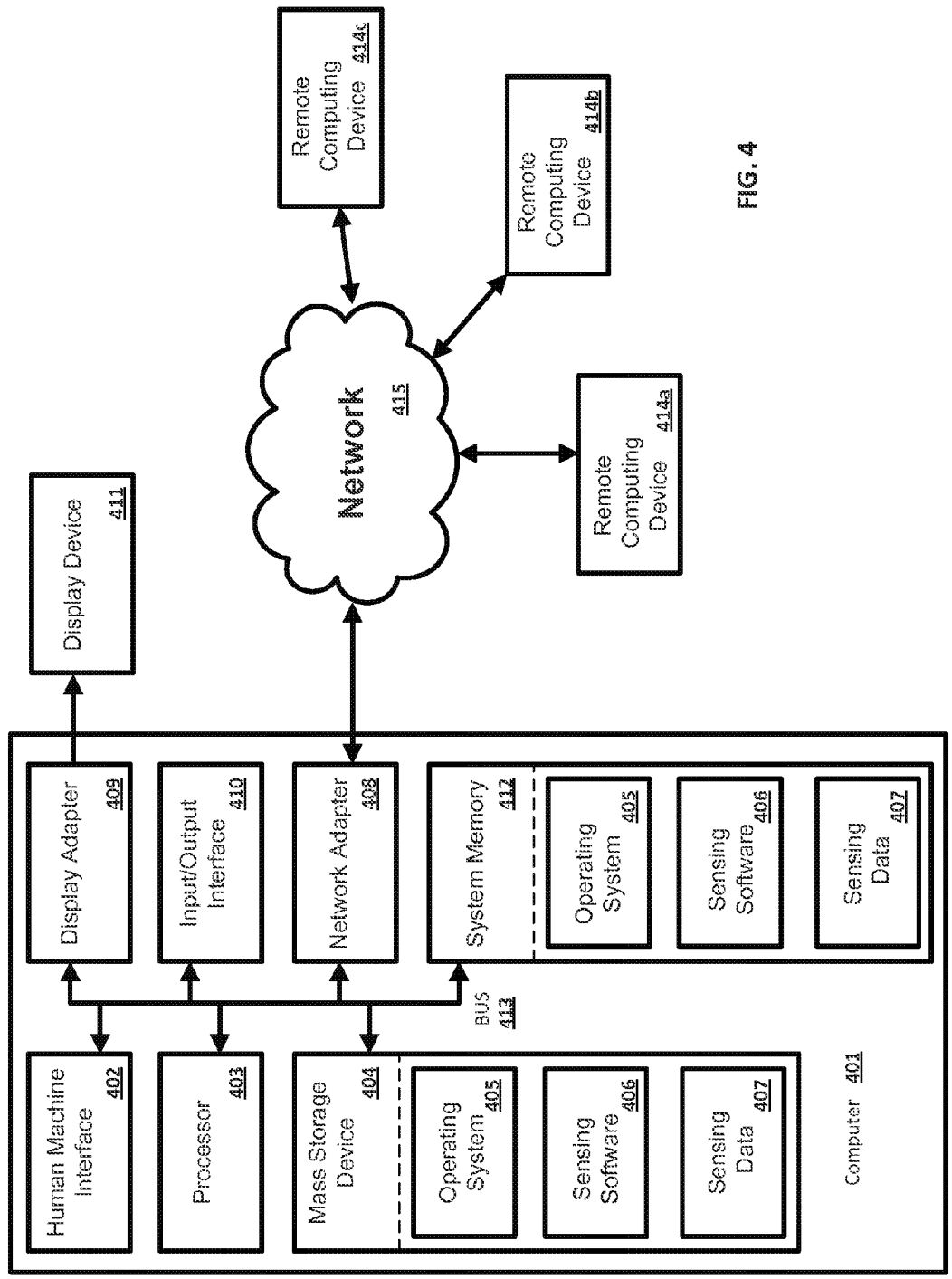
FIG. 4 is a block diagram illustrating an exemplary computer in which the present methods can operate.
Figure 5B:
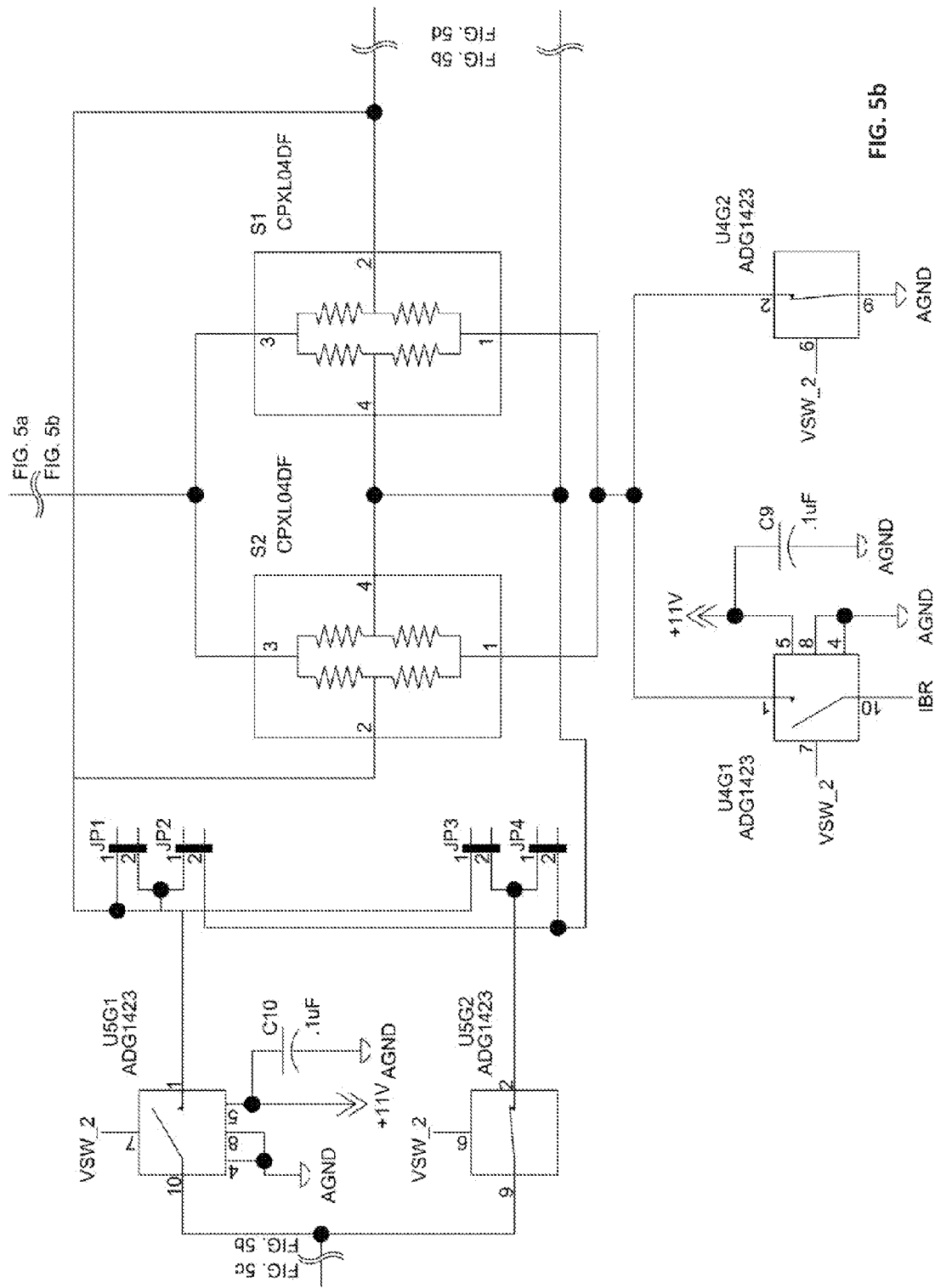
FIG. 5b is a circuit diagram illustrating an exemplary pair of piezo-resistive pressure sensors and switching mechanisms.
Figure 5C:
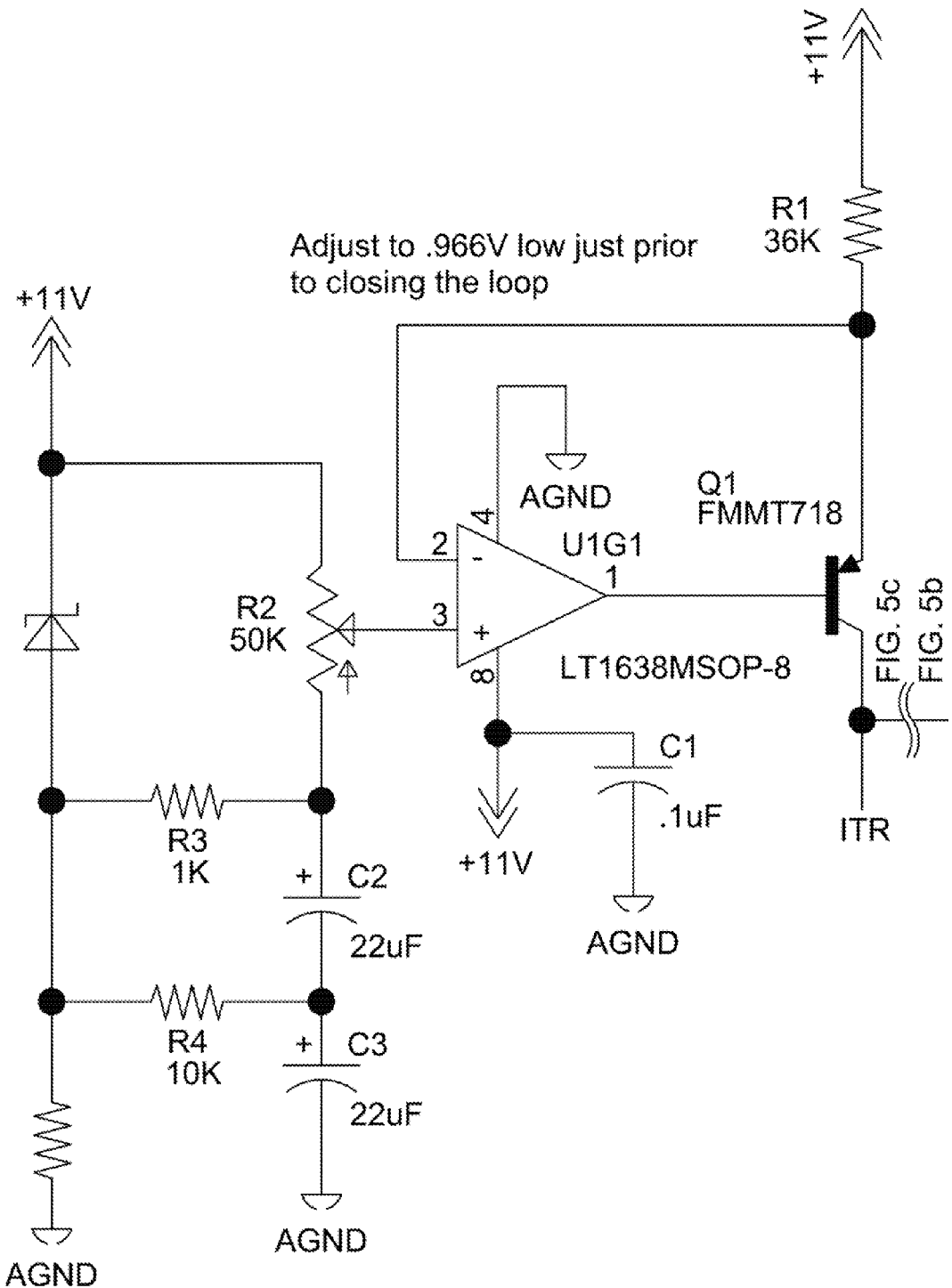
FIG. 5c is a circuit diagram illustrating an exemplary fixed current source used in conjunction with the second current source.
Figure 5D:
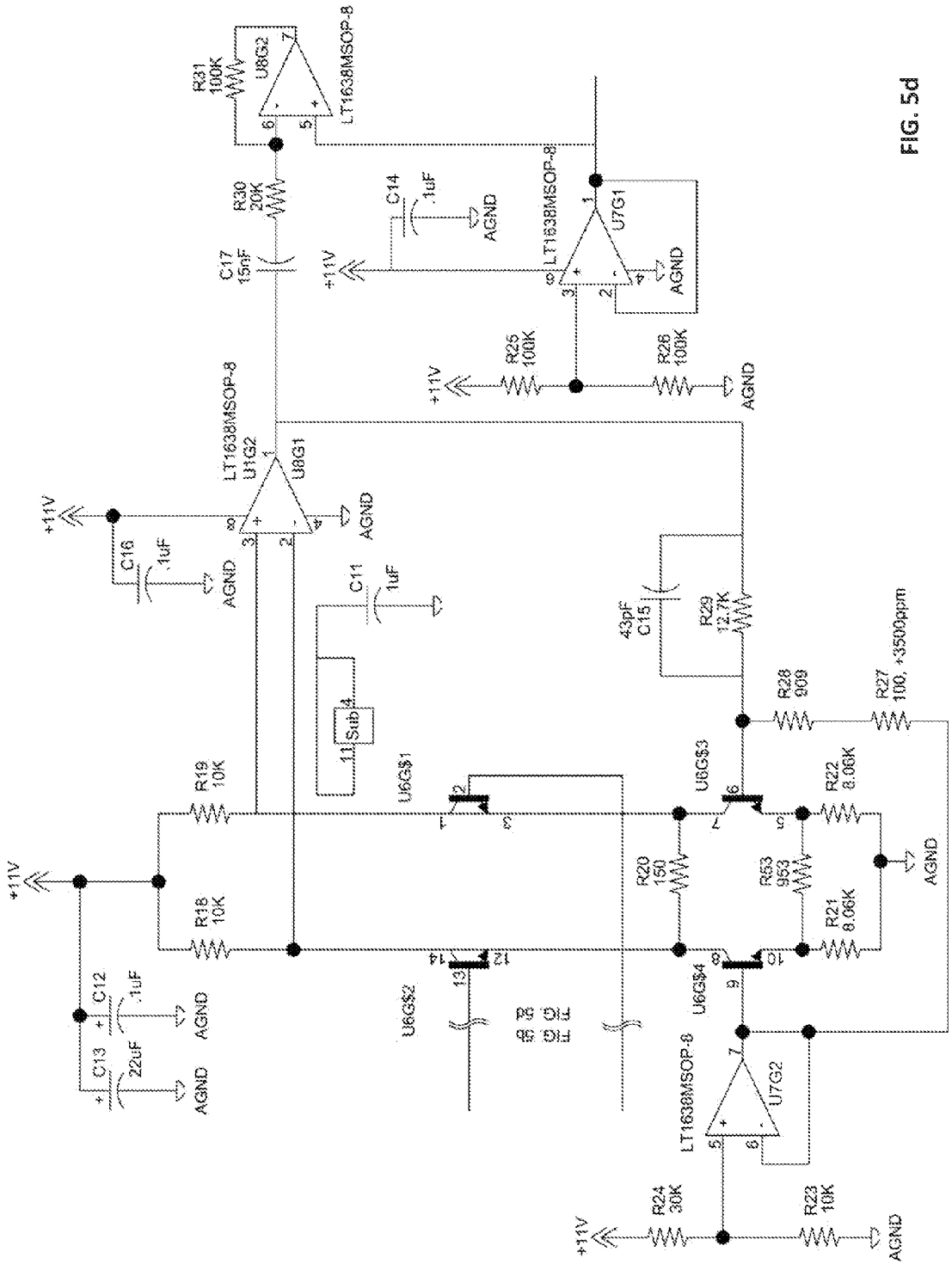
FIG. 5d is a circuit diagram illustrating an exemplary low noise amplifier and portions of a bandpass filter.
Figure 6A:
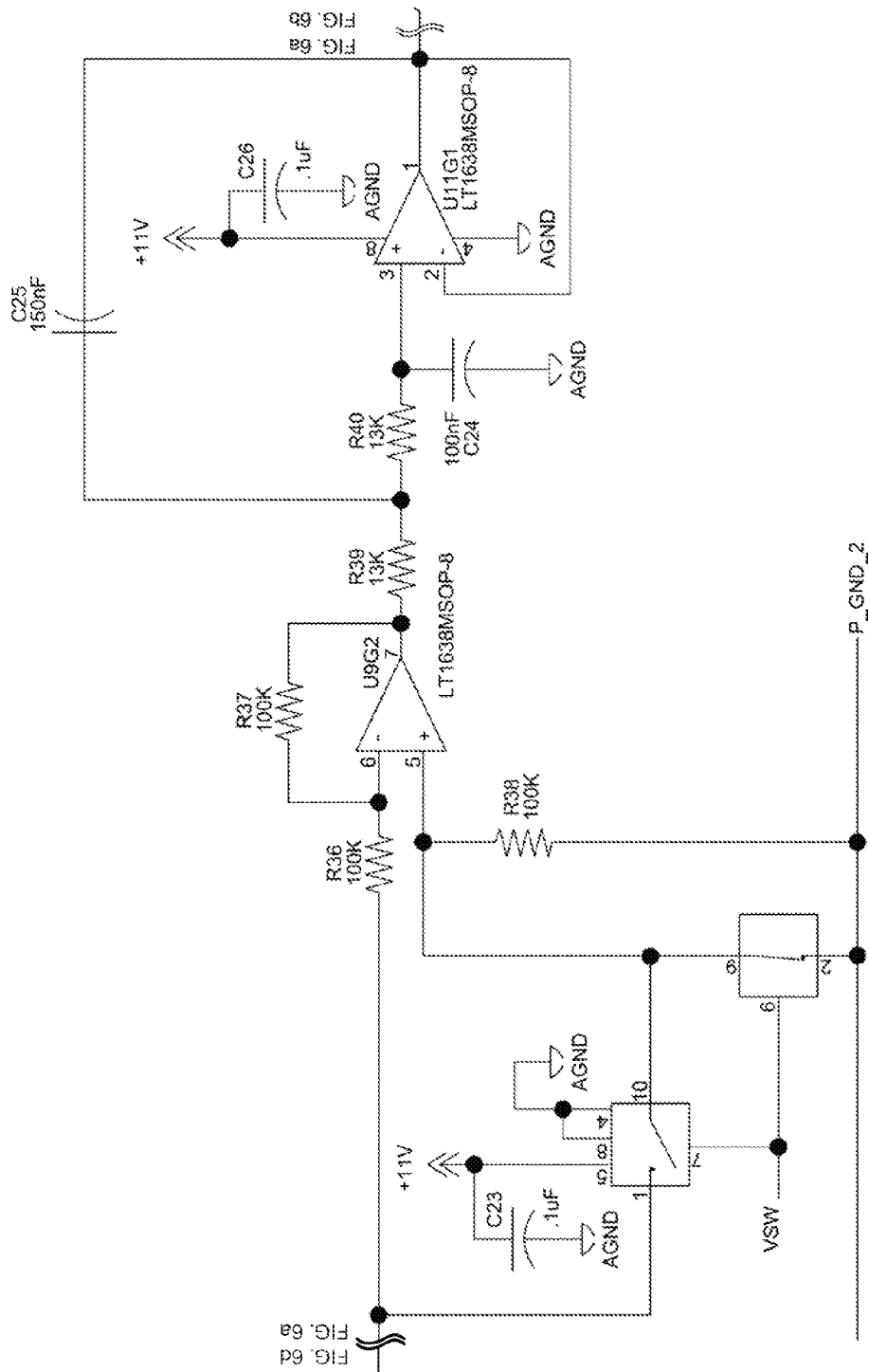
FIG. 6a is a circuit diagram illustrating an exemplary demodulator, portions of a bandpass filter, and portions of a lowpass filter.
Figure 6B:
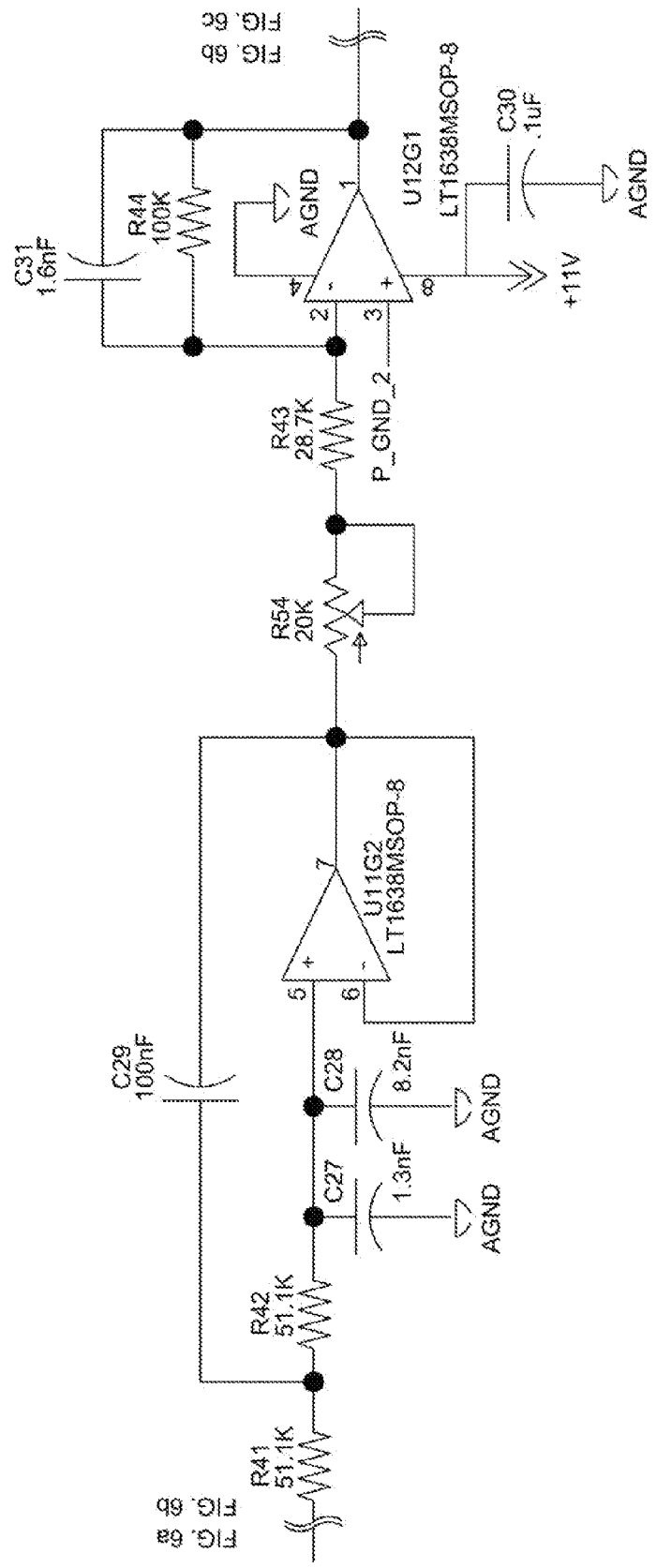
FIG. 6b is a circuit diagram illustrating an exemplary amplifier and portions of a lowpass filter.
Figure 6C:
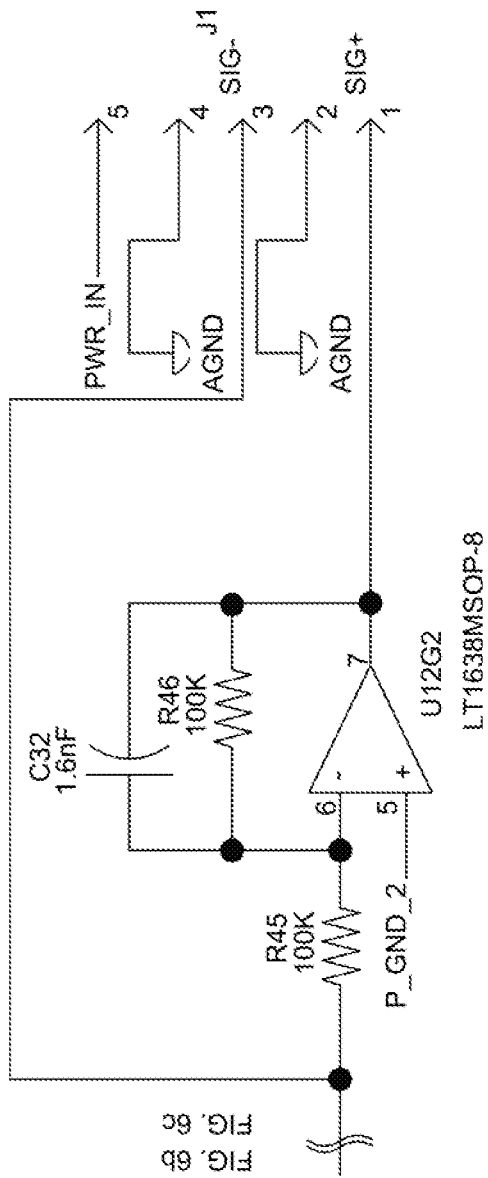
FIG. 6c is a circuit diagram illustrating an exemplary inverting amplifier used to provide a differential output signal.
Figure 6D:
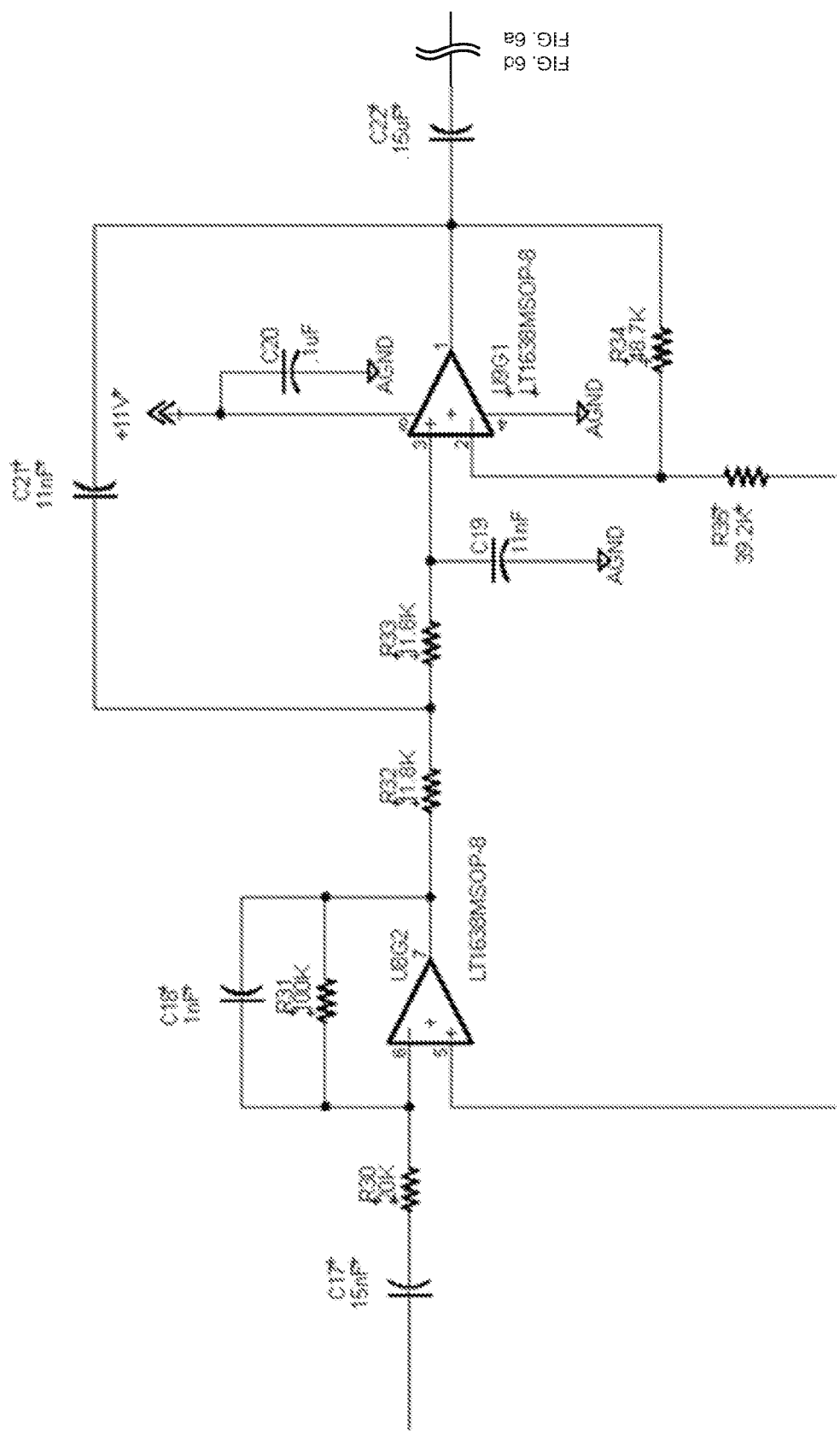
FIG. 6d is a circuit diagram illustrating an exemplary bandpass filter.

In an exemplary aspect, the methods and systems can be implemented on a computer 401 as illustrated in FIG. 4 and described below. By way of example, the output 140 of the circuit of FIG. 1 can be coupled to a computer as illustrated in FIG. 4. Similarly, the methods and systems disclosed can utilize one or more computers to perform one or more functions in one or more locations. FIG. 4 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 401. The components of the computer 401 can comprise, but are not limited to, one or more processors or processing units 403, a system memory 412, and a system bus 413 that couples various system components including the processor 403 to the system memory 412. In the case of multiple processing units 403, the system can utilize parallel computing.

The system bus 413 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 413, and all buses specified in this description can also be implemented over a wired or wireless network connection and each of the subsystems, including the processor 403, a mass storage device 404, an operating system 405, sensing software 406, sensing data 407, a network adapter 408, system memory 412, an Input/Output Interface 410, a display adapter 409, a display device 411, and a human machine interface 402, can be contained within one or more remote computing devices 414a,b,c at physically separate locations, connected through buses of this form, in effect implementing a fully distributed system.

The computer 401 typically comprises a variety of computer readable media. Exemplary readable media can be any available media that is accessible by the computer 401 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 412 typically contains data such as sensing data 407 and/or program modules such as operating system 405 and sensing software 406 that are immediately accessible to and/or are presently operated on by the processing unit 403.

In another aspect, the computer 401 can also comprise other removable/non-removable, volatile/non-volatile computer storage media. By way of example, FIG. 4 illustrates a mass storage device 404 which can provide non-volatile storage of computer code, computer readable instructions, data structures, program modules, and other data for the computer 401. For example and not meant to be limiting, a mass storage device 404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 404, including by way of example, an operating system 405 and sensing software 406. Each of the operating system 405 and sensing software 406 (or some combination thereof) can comprise elements of the programming and the sensing software 406. Sensing data 407 can also be stored on the mass storage device 404. Sensing data 407 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 401 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 403 via a human machine interface 402 that is coupled to the system bus 413, but can be connected by other interface and bus structures, such as a parallel port, game port, an IEEE 1394 Port (also known as a Firewire port), a serial port, or a universal serial bus (USB).

In yet another aspect, a display device 411 can also be connected to the system bus 413 via an interface, such as a display adapter 409. It is contemplated that the computer 401 can have more than one display adapter 409 and the computer 401 can have more than one display device 211. For example, a display device can be a monitor, an LCD (Liquid Crystal Display), or a projector. In addition to the display device 411, other output peripheral devices can comprise components such as speakers (not shown) and a printer (not shown) which can be connected to the computer 401 via Input/Output Interface 410. Any step and/or result of the methods can be output in any form to an output device. Such output can be any form of visual representation, including, but not limited to, textual, graphical, animation, audio, tactile, and the like. The display 411 and computer 401 can be part of one device, or separate devices.

The computer 401 can operate in a networked environment using logical connections to one or more remote computing devices 414a,b,c. By way of example, a remote computing device can be a personal computer, portable computer, smartphone, a server, a router, a network computer, a peer device or other common network node, and so on. Logical connections between the computer 401 and a remote computing device 414a,b,c can be made via a network 415, such as a local area network (LAN) and/or a general wide area network (WAN). Such network connections can be through a network adapter 408. A network adapter 408 can be implemented in both wired and wireless environments. Such networking environments are conventional and commonplace in dwellings, offices, enterprise-wide computer networks, intranets, and the Internet.

For purposes of illustration, application programs and other executable program components such as the operating system 405 are illustrated herein as discrete blocks, although it is recognized that such programs and components reside at various times in different storage components of the computing device 401, and are executed by the data processor(s) of the computer. An implementation of sensing software 406 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 8:
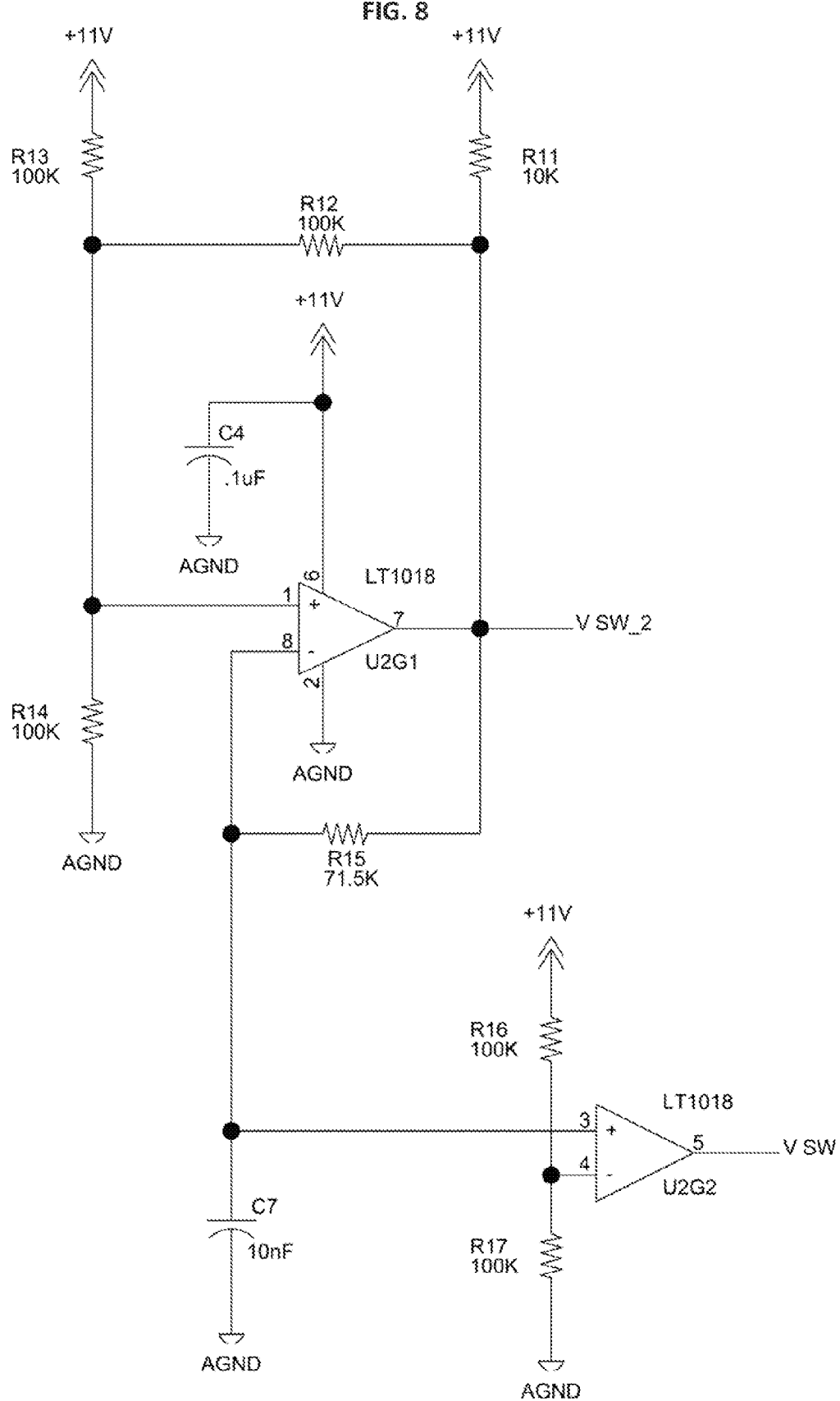
FIG. 8 is a circuit diagram illustrating an exemplary oscillator with primary and phase shifted outputs.
Figure 9:
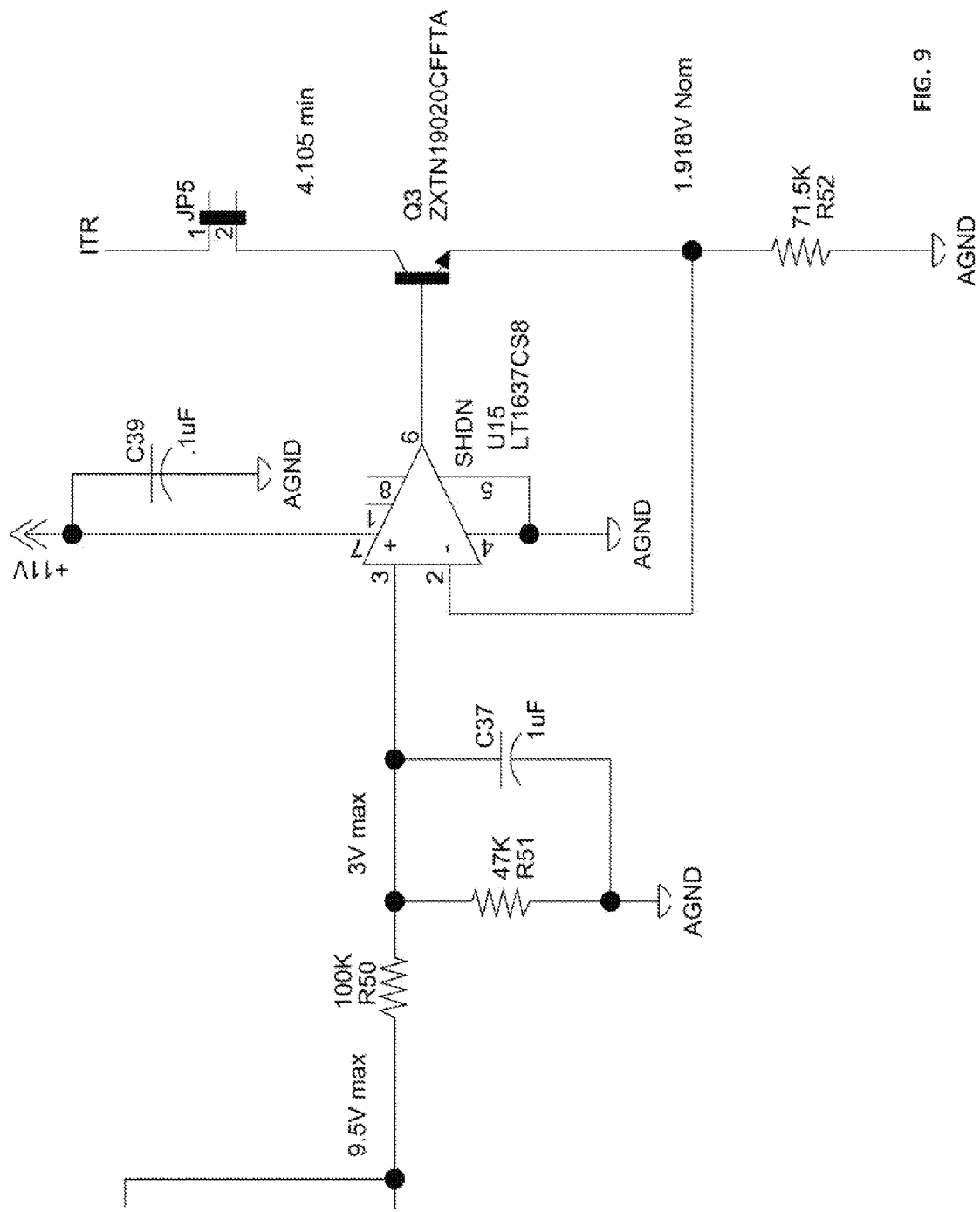
FIG. 9 is a circuit diagram illustrating an exemplary second current source.

FIGS. 5-9 are circuit diagrams illustrating in greater detail aspects of the circuit, apparatus, and device described in the present disclosure. FIGS. 5a-5d are circuit diagrams illustrating exemplary current sources, switches, pressure sensors, and amplifiers. FIG. 5a is a circuit diagram illustrating an exemplary first current source 114 and switch 116 as referenced in FIG. 1. Circuit elements D2 and R7 can provide an adjustable voltage that is referred to Vcc (+11V). Resistors R8-R10 and capacitors C5 and C6 can function as a lowpass filter that reduces noise from D2. Circuit elements U1G2, Q2, and R6 can function as a current source whose current is determined by the voltage on pin 5 of U1G2. Switches U3G2 and U3G1 can be configured to alternately inject current into the top of the pressure sensor (106 as referenced in FIG. 1) then ground the top of the sensor. FIG. 5b is a circuit diagram illustrating an exemplary pair of piezo-resistive pressure sensors 102, switches 122 and 124, and switch 118 as referenced in FIG. 1. Circuit elements S1 and S2 can implement the pressure sensors 102. Circuit elements U5G1 and U5G2 can implement switches 122 and 124, and circuit elements U4G1 and U4G2 can implement switch 118. FIG. 5c is a circuit diagram illustrating an exemplary fixed current source that can create a slight positive offset on the output ports of the pressure sensor. In one aspect, the circuit design can be identical to the one illustrated in FIG. 5a. The variable current source illustrated in FIG. 9 can servo the sensor offset to zero by sinking the amount of current necessary from node $I_{tr}$ to balance the sensor bridge. FIG. 5d is a circuit diagram illustrating an exemplary low noise amplifier 130 and portions of the bandpass 132 filter as referenced in FIG. 1. Transistor array U6, operational amplifiers ("op-amp") U7G2 and U1G2, and related components can function as an ultra-low noise, low power, differential amplifier. Op-amp U8G2, capacitor C17, and resistors R30 and R31 can function as the highpass portion of bandpass filter 132. Op-amp U7G1 and the voltage divider formed by resistors R25 and R26 can provide a pseudo ground reference voltage. FIGS. 6a-6d are circuit diagrams illustrating an exemplary demodulator, lowpass filter, and output amplifiers. FIG. 6a is a circuit diagram illustrating an exemplary demodulator 134 and portions of a lowpass filter 138 as referenced in FIG. 1. The two switches, op-amp U9G2 and related components can function as the demodulator. The demodulator can operate by alternately connecting the non-inverting input of U9G2 to pseudo-ground and then to the amplifier input signal. This mode of operation can cause the amplifier gain to switch between +1 and −1, thereby synchronously full-wave rectifying the input signal. In one aspect, op-amp U11G1, resistors R39 and R40, and capacitors C24 and C25 can constitute a portion of lowpass filter 138 of FIG. 1. FIG. 6b is a circuit diagram illustrating an exemplary amplifier A3 and a portion of lowpass filter 138 as referenced in FIG. 1. In one aspect, op-amp U11G2, resistors R41 and R42, and capacitors C27-C28 can function as the remaining portion of lowpass filter 138. The remaining components can form amplifier A3. FIG. 6c is a circuit diagram illustrating an exemplary inverting amplifier used with U12G1 to provide a differential output signal. FIG. 6d is a circuit diagram illustrating an exemplary bandpass filter 132 as referenced in FIG. 1. For example, circuit element U9G1 and related components can function as the lowpass portion of bandpass filter 132 of FIG. 1. FIG. 7 is a circuit diagram illustrating an exemplary voltage regulator. FIG. 8 is a circuit diagram illustrating an exemplary oscillator with primary and phase shifted outputs. FIG. 9 is a circuit diagram illustrating an exemplary second current source.

Figure 10:
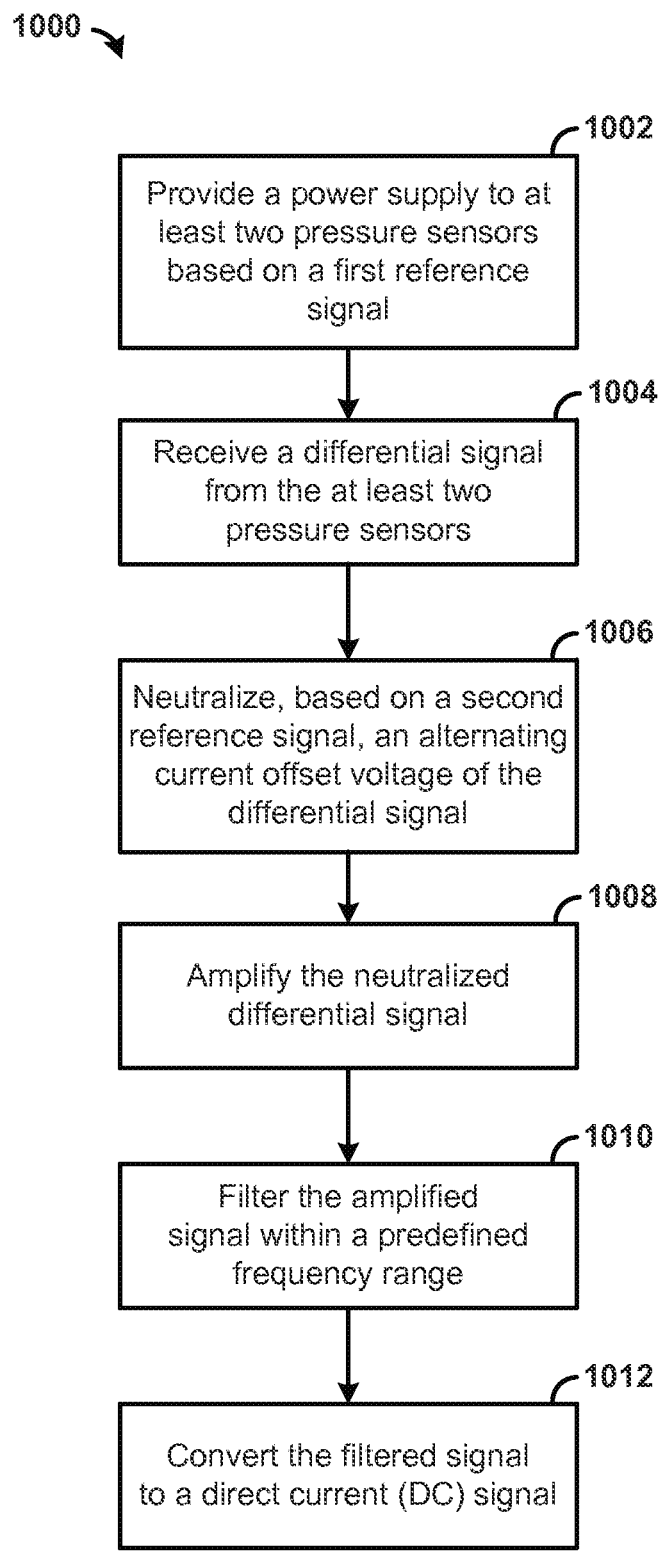
FIG. 10 is a flowchart illustrating an exemplary method for detecting pressure variations.

FIG. 10 is a flowchart illustrating an exemplary method 1000 for detecting pressure variations. At step 1002, a power supply can be provided to at least two pressure sensors based on a first reference signal The at least two pressure sensors can be electrically coupled in parallel. For example, the at least two pressure sensors can be electrically coupled in parallel and in phase. As another example, the at least two pressure sensors can be connected pneumatically in parallel and in phase. In one aspect, the at least two pressure sensors have a front and a back. For example, a back of a first pressure sensor of the at least two pressure sensors can face a back of a second pressure sensor of the at least two pressure sensors. In one aspect, the at least two pressure sensors can comprise (e.g., in each pressure sensor, in one or more pressure sensors) a set of resistors configured as a Wheatstone bridge. At least one of the resistors of the set of resistors can be configured to provide a resistance that varies based on changes in pressure upon the resistor.

In one aspect, providing a power supply to the at least two pressure sensors can comprise increasing a signal-to-noise ratio of the differential signal by a predefined factor. For example, the signal-to-noise ratio can be increased by driving current in alternate directions through the at least two pressure sensors (e.g., thereby doubling or otherwise increasing the AC output signal amplitude with no increase in power consumption). In another aspect, providing a power supply to the at least two pressure sensors can comprise alternating, based on the first reference signal, between providing a current source to a first differential input of the at least two pressure sensors and providing the current source to a second differential input of the at least two pressure sensors. In another aspect, providing a power supply to the at least two pressure sensors can comprise providing a temperature compensating power supply based on a resistor configured to change resistance based on a change in temperature. In another aspect, providing a power supply to the at least two pressure sensors can comprise providing a temperature compensating power supply based on a resistor configured to change resistance based on a change in temperature.

At step 1004, a differential signal can be received from the at least two pressure sensors. For example, the differential signal comprise differential signals from each of (e.g., some or all of) the at least two pressure sensors.

At step 1006, an alternating current offset voltage of the differential signal can be neutralized based on a second reference signal. In some configurations, the first reference signal and the second reference signal can be the same signal. In one aspect, neutralizing the alternating current offset voltage of the differential signal can comprise alternating, based on the second reference signal, between providing a current source to a first differential output of the at least two pressure sensors and providing the current source to a second differential input of the at least two pressure sensors. In another aspect, neutralizing, based on the second reference signal, an alternating current offset voltage of the differential signal can comprise providing feedback to null an offset directly at the at least two pressure sensors.

At step 1008, the neutralized differential signal can be amplified. For example, the neutralized differential signal can be received (e.g., by an amplifier) from the at least two pressure sensors. In one aspect, amplifying the neutralized differential signal can comprise amplifying a difference between a voltage of a first signal of the neutralized differential signal and a voltage of a second signal of the neutralized differential signal. In one aspect, amplifying the neutralized differential signal can be optimized for high gain and low noise.

At step 1010, the amplified signal can be filtered within a predefined frequency range. For example, the amplified signal can be filtered by a bandpass filter. At step 1012, the filtered signal can be converted to a direct current (DC) signal. For example, the amplified signal (e.g., and the filtered signal) can be an alternating current (AC) signal. In one aspect, the filtered signal can be converted to a DC signal by a demodulator.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A circuit for detecting pressure variations, comprising:
   at least two pressure sensors electrically coupled in parallel, wherein at least one of the pressure sensors comprises a differential input and a differential output;
   a first switching mechanism electrically coupled to the differential input of the at least one pressure sensor, the first switching mechanism is configured to electrically couple a first current source to the at least one pressure sensor according to a first reference signal;
   a resistor electrically coupled to the first switching mechanism, wherein the resistor is configured to provide a resistance that varies based on changes in temperature; and
   a second switching mechanism electrically coupled to the differential output of the at least one pressure sensor, the second switching mechanism is configured to electrically couple a second current source to the at least one pressure sensor according to a second reference signal.

2. The circuit of claim 1, wherein the first switching mechanism is configured to increase a signal-to-noise ratio of the at least one pressure sensor by a predefined factor.

3. The circuit of claim 1, wherein the second switching mechanism is configured to neutralize an alternating current offset voltage of the at least one pressure sensor.

4. The circuit of claim 1, further comprising an amplifier electrically coupled to the at least two pressure sensors, the amplifier is configured to receive differential signals from the at least one pressure sensor and provide a signal proportional to a difference of voltages of the differential signals, wherein the differential signals received by the amplifier are modified by the second switching mechanism.

5. The circuit of claim 4, wherein the second switching mechanism is configured to provide feedback to null an offset directly at the at least one pressure sensor, and wherein the amplifier is optimized for high gain and low noise.

6. The circuit of claim 4, further comprising a bandpass filter electrically coupled to the amplifier, wherein the bandpass filter is configured to receive a signal from the amplifier and provide a portion of the signal within a predefined frequency range.

7. The circuit of claim 6, further comprising a demodulator electrically coupled to the bandpass filter, wherein the demodulator is configured to receive an alternating current (AC) signal from the bandpass filter and provide a direct current (DC) signal.

8. The circuit of claim 1, wherein the at least two pressure sensors have a front and a back, and wherein a back of a first pressure sensor of the at least two pressure sensors faces a back of a second pressure sensor of the at least two pressure sensors.

9. The circuit of claim 1, wherein the at least two pressure sensors comprise a set of resistors configured as a Wheatstone bridge, at least one of the resistors of the set of resistors is configured to provide a resistance that varies based on changes in pressure upon the resistor, and wherein the first reference signal and the second reference signal are phase locked.

10. The circuit of claim 1, wherein the at least two pressure sensors are electrically coupled in parallel and in phase.

11. The circuit of claim 1, wherein the at least two pressure sensors are connected pneumatically in parallel and in phase.

12. The circuit of claim 1, wherein the at least two pressure sensors have a front and a back, and wherein a back of a first pressure sensor of the at least two pressure sensors faces a back of a second pressure sensor of the at least two pressure sensors, and wherein the at least two pressure sensors are electrically and pneumatically coupled in parallel and in phase.

13. An apparatus for detecting pressure variations, comprising:
   a sensing circuit, comprising,
      at least two pressure sensors electrically coupled in parallel, wherein at least one of the pressure sensors has a differential input and a differential output,
      a first switching mechanism electrically coupled to the differential input of the at least one pressure sensor, the first switching mechanism is configured to electrically couple a first current source to the at least one pressure sensor according to a first reference signal, a resistor electrically coupled to the first switching mechanism, wherein the resistor is configured to provide a resistance that varies based on changes in temperature, and a second switching mechanism electrically coupled to the differential output of the at least one pressure sensor, the second switching mechanism is configured to electrically couple a second current source to the at least one pressure sensor according to a second reference signal;

a manifold configured to receive a pressure and communicate the pressure to the at least two pressure sensors; and a reference chamber configured to provide a reference pressure to the at least two pressure sensors.

14. The apparatus of claim 13, wherein the first switching mechanism is configured to increase a signal-to-noise ratio of the at least one pressure sensor by a predefined factor.

15. The apparatus of claim 13, wherein the second switching mechanism is configured to neutralize an alternating current offset voltage of the at least one pressure sensor.

16. The apparatus of claim 13, wherein the sensing circuit further comprises an amplifier electrically coupled to the at least two pressure sensors, the amplifier is configured to receive differential signals from the at least one pressure sensor and provide a signal proportional to a difference of voltages of the differential signals, wherein the differential signals received by the amplifier are modified by the second switching mechanism.

17. The apparatus of claim 13, wherein the at least two pressure sensors are electrically coupled in parallel and in phase, and wherein the at least two pressure sensors are connected pneumatically in parallel and in phase.

18. A method for detecting pressure variations, comprising:

providing a power supply to at least two pressure sensors based on a first reference signal, wherein the at least two pressure sensors are electrically coupled in parallel;

receiving a differential signal from the at least two pressure sensors;

neutralizing, based on a second reference signal, an alternating current offset voltage of the differential signal; and amplifying the neutralized differential signal, wherein amplifying the neutralized differential signal comprises, receiving the neutralized differential signal from the at least two pressure sensors, and amplifying a difference between a voltage of a first signal of the neutralized differential signal and a voltage of a second signal of the neutralized differential signal.

19. The method of claim 18, wherein providing a power supply to the at least two pressure sensors comprises increasing a signal-to-noise ratio of the differential signal by a predefined factor.

20. The method of claim 18, wherein neutralizing the alternating current offset voltage of the differential signal comprises alternating, based on the second reference signal, between providing a current source to a first differential output of the at least two pressure sensors and providing the current source to a second differential input of the at least two pressure sensors.

21. The method of claim 18, wherein the at least two pressure sensors have a front and a back, and wherein a back of a first pressure sensor of the at least two pressure sensors faces a back of a second pressure sensor of the at least two pressure sensors.

22. The method of claim 18, wherein providing a power supply to the at least two pressure sensors comprises alternating, based on the first reference signal, between providing a current source to a first differential input of the at least two pressure sensors and providing the current source to a second differential input of the at least two pressure sensors.

23. The method of claim 18, further comprising filtering the amplified signal within a predefined frequency range.

24. The method of claim 23, wherein the filtered signal is an alternating current (AC) signal, further comprising converting the filtered signal to a direct current (DC) signal.

25. The method of claim 18, wherein providing a power supply to at least two pressure sensors comprises providing a temperature compensating power supply based on a resistor configured to change resistance based on a change in temperature.

26. The method of claim 18, wherein the at least two pressure sensors comprise a set of resistors configured as a Wheatstone bridge, at least one of the resistors of the set of resistors is configured to provide a resistance that varies based on changes in pressure upon the resistor, and wherein the first reference signal and the second reference signal are phase locked.

27. The method of claim 18, wherein neutralizing, based on a second reference signal, an alternating current offset voltage of the differential signal comprises providing feedback to null an offset directly at the at least two pressure sensors, and wherein amplifying the neutralized differential signal is optimized for high gain and low noise.

28. The method of claim 18, wherein the at least two pressure sensors are electrically coupled in parallel and in phase.

29. The method of claim 18, wherein the at least two pressure sensors are connected pneumatically in parallel and in phase.

30. A circuit for detecting pressure variations, comprising:

at least two pressure sensors electrically coupled in parallel, wherein at least one of the pressure sensors comprises a differential input and a differential output, wherein the at least two pressure sensors comprise a set of resistors configured as a Wheatstone bridge, wherein at least one of the resistors of the set of resistors is configured to provide a resistance that varies based on changes in pressure upon the at least one of the resistors;

a first switching mechanism electrically coupled to the differential input of the at least one pressure sensor, the first switching mechanism is configured to electrically couple a first current source to the at least one pressure sensor according to a first reference signal; and a second switching mechanism electrically coupled to the differential output of the at least one pressure sensor, the second switching mechanism is configured to electrically couple a second current source to the at least one pressure sensor according to a second reference signal, wherein the first reference signal and the second reference signal are phase locked.

31. A method for detecting pressure variations, comprising:

providing a power supply to at least two pressure sensors based on a first reference signal, wherein the at least two pressure sensors are electrically coupled in parallel, wherein providing the power supply to the at least two pressure sensors comprises alternating, based on the first reference signal, between providing a current source to a first differential input of the at least two pressure sensors and providing the current source to a second differential input of the at least two pressure sensors;

receiving a differential signal from the at least two pressure sensors;

neutralizing, based on a second reference signal, an alternating current offset voltage of the differential signal; and amplifying the neutralized differential signal.

32. A method for detecting pressure variations, comprising:

providing a power supply to at least two pressure sensors based on a first reference signal, wherein the at least two pressure sensors are electrically coupled in parallel, providing a power supply to at least two pressure sensors comprises providing a temperature compensating power supply based on a resistor configured to change resistance based on a change in temperature;

receiving a differential signal from the at least two pressure sensors;

neutralizing, based on a second reference signal, an alternating current offset voltage of the differential signal; and amplifying the neutralized differential signal.

33. A method for detecting pressure variations, comprising:

providing a power supply to at least two pressure sensors based on a first reference signal, wherein the at least two pressure sensors are electrically coupled in parallel, wherein the at least two pressure sensors comprise a set of resistors configured as a Wheatstone bridge, wherein at least one of the resistors of the set of resistors is configured to provide a resistance that varies based on changes in pressure upon the at least one of the resistors;

receiving a differential signal from the at least two pressure sensors;

neutralizing, based on a second reference signal, an alternating current offset voltage of the differential signal wherein the first reference signal and the second reference signal are phase locked; and amplifying the neutralized differential signal.

34. A method for detecting pressure variations, comprising:

providing a power supply to at least two pressure sensors based on a first reference signal, wherein the at least two pressure sensors are electrically coupled in parallel;

receiving a differential signal from the at least two pressure sensors;

neutralizing, based on a second reference signal, an alternating current offset voltage of the differential signal, wherein neutralizing, based on the second reference signal, the alternating current offset voltage of the differential signal comprises providing feedback to null an offset directly at the at least two pressure sensors, and wherein amplifying the neutralized differential signal is optimized for high gain and low noise; and amplifying the neutralized differential signal.

35. The method of claim 34, wherein the at least two pressure sensors have a front and a back, and wherein a back of a first pressure sensor of the at least two pressure sensors faces a back of a second pressure sensor of the at least two pressure sensors, and wherein the at least two pressure sensors are electrically and pneumatically coupled in parallel and in phase.

* * * * *